US011956016B2

(12) United States Patent
Ooi et al.

(10) Patent No.: US 11,956,016 B2
(45) Date of Patent: Apr. 9, 2024

(54) HYBRID SENSING-COMMUNICATION OPTICAL SYSTEM AND METHOD (71) Applicant: KING ABDULLAH UNIVERSITY OF SCIENCE AND TECHNOLOGY, Thuwal (SA)

(72) Inventors: Boon Siew Ooi, Thuwal (SA); Islam Ashry, Thuwal (SA); Yuan Mao, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 1 day.

(21) Appl. No.: 17/914,039

(22) PCT Filed: Mar. 8, 2021

(86) PCT No.: PCT/IB2021/051916
§ 371 (c)(1),
(2) Date: Sep. 23, 2022

(87) PCT Pub. No.: WO2021/198811
PCT Pub. Date: Oct. 7, 2021

(65) Prior Publication Data
US 2023/0121430 A1 Apr. 20, 2023

Related U.S. Application Data (60) Provisional application No. 63/001,788, filed on Mar. 30, 2020.

(51) Int. Cl.
*H04B 10/00* (2013.01)
*G02B 6/02* (2006.01)
(Continued)

(52) U.S. Cl.
CPC ..... *H04B 10/2581* (2013.01); *G02B 6/02042* (2013.01)

(58) Field of Classification Search
CPC .......... H04J 14/04; H04J 14/05; H04J 14/052
See application file for complete search history.

(56) References Cited

U.S. PATENT DOCUMENTS

2015/0222356 A1* 8/2015 Kawanishi ....... H04B 10/25891
398/43
2017/0026351 A1* 1/2017 Feller ................. H04B 10/2581

OTHER PUBLICATIONS

Substantive Examination Report in corresponding/related Saudi Arabian Application No. 522440753, dated Jun. 22, 2023.
(Continued)

*Primary Examiner* — Daniel G Dobson
(74) *Attorney, Agent, or Firm* — PATENT PORTFOLIO BUILDERS PLLC (57) ABSTRACT

A hybrid sensing-communication system includes a multi-core optical fiber that includes first and second cores, a first communication device optically coupled to a first end of the first core of the multicore optical fiber, a second communication device optically coupled to a second end of the first core of the multicore optical fiber, a first sensing device optically coupled to a first end of the second core of the multicore optical fiber, and a second sensing device optically coupled to a second end of the second core of the multicore optical fiber. The first and second communication devices exclusively exchange communication data along the first core, the first and second sensing devices exclusively exchange sensing data along the second core, and the communication data is different from the sensing data.

19 Claims, 8 Drawing Sheets

(51) Int. Cl.
*H04B 10/2581* (2013.01)
*H04J 14/00* (2006.01)

(56) References Cited

OTHER PUBLICATIONS

Cooper, L.J., et al., "Design and Performance of Multicore Fiber Optimized Towards Communications and Sensing Applications," Proceedings of SPIE, Mar. 16, 2015, vol. 9359, pp. 9359OH-1-9359OH-7, IEEE.
International Search Report in corresponding/related International Application No. PCT/IB2021/051916, dated Jun. 18, 2021.
Written Opinion of the International Searching Authority in corresponding/related International Application No. PCT/IB2021/051916, dated Jun. 18, 2021.
Zhan, X., et al., "Few-Mode Multicore Fiber Enabled Integrated Mach-Zehnder Interferometers for Temperature and Strain Discrimination," Optics Express, Jun. 4, 2018, vol. 26, No. 12, pp. 15332-15342.

\* cited by examiner

HYBRID SENSING-COMMUNICATION OPTICAL SYSTEM AND METHOD

CROSS-REFERENCE TO RELATED APPLICATIONS

This application is a U.S. National Stage Application of International Application No. PCT/IB2021/051916, filed on Mar. 8, 2021, which claims priority to U.S. Provisional Patent Application No. 63/001,788, filed on Mar. 30, 2020, entitled "OPTICAL HYBRID SENSING-COMMUNICATION SYSTEM USING A MULTICORE FIBER," the disclosures of which are incorporated herein by reference in theft entirety.

BACKGROUND

Technical Field

Embodiments of the subject matter disclosed herein generally relate to an optical system that is capable of simultaneous multi-channel communication and multi-parameter sensing, and more particularly, to a system that uses a multicore optical fiber in which one or more cores are dedicated to communication and one or more of the remaining cores are dedicated to parameter sensing.

Discussion of the Background

Optical fibers have successfully found two major applications: communication and sensing. Fiber-optic communication is currently a mature technology in which standard single-mode fiber (SMF) and multimode fiber (MMF) are typically used to transmit audio, video, telemetry, etc. Comparatively, fiber-optic sensing is younger, but has been recently included in many industrial applications, such as oil and gas industry and structural and health monitoring.

One area of current interest in fiber optics is the integration of communication and sensing using a single optical fiber. It is expected that such mixed system will be widely used in a myriad of applications since this system will save resources by avoiding installing a separate fiber for each usage. Deploying simultaneous communication and sensing systems using the standard SMF/MMF, which comprises a single core, would create significant noises in the two systems. This is because the communication and sensing signals may interfere with each other in the time-, wavelength-, polarization-, and space-domain. Consequently, there is a strong need to produce a reliable hybrid sensing-communication system using a single optical fiber.

The aforementioned challenges can be resolved by using time-division-multiplexing (TDM), wavelength-division-multiplexing (WDM), and/or space-division-multiplexing (SDM) schemes. TDM and WDM are mature technologies; however, using them reduces the throughput in a communication channel, which is not recommended considering the current global rapid increase in bandwidth demands.

Thus, there is a need for a new system that is capable of delivering the communication and parameters measurements with no interference and/or speed limitations.

BRIEF SUMMARY OF THE INVENTION

According to an embodiment, there is a hybrid sensing-communication system that includes a multicore optical fiber that includes first and second cores, a first communication device optically coupled to a first end of the first core of the multicore optical fiber, a second communication device optically coupled to a second end of the first core of the multicore optical fiber, a first sensing device optically coupled to a first end of the second core of the multicore optical fiber, and a second sensing device optically coupled to a second end of the second core of the multicore optical fiber. The first and second communication devices exclusively exchange communication data along the first core, the first and second sensing devices exclusively exchange sensing data along the second core, and the communication data is different from the sensing data.

According to another embodiment, there is a coherent optical sensing and communication system that includes a multicore optical fiber that includes first and second cores, a first communication device optically coupled to a first end of the first core of the multicore optical fiber, the first communication device having a first local oscillator that generates a first local oscillating signal, and a second communication device optically coupled to a second end of the first core of the multicore optical fiber, the second communication device having a second local oscillator that receives the first local oscillating signal. The first and second communication devices exclusively exchange communication data along the first core, and the first and second local oscillators exclusively exchange the first local oscillating signal along the second core.

According to yet another exemplary embodiment, there is a method for synchronizing communication and sensing devices in a network, and the method includes generating a first local oscillating signal at a first local oscillator, generating communication data at a first communication device, which is optically coupled to a first end of a first core of a multicore optical fiber, the first communication device having the first local oscillator that generates the first local oscillating signal, sending the communication data along the first core of the multicore optical fiber, sending the first local oscillator signal along a second core of the multicore optical fiber, receiving at a second communication device, which is optically coupled to a second end of the first core of the multicore optical fiber, the communication data, receiving at a second local oscillator, which is part of the second communication device, the first local oscillating signal, and using the first local oscillating signal to decode the communication data. The first and second communication devices exclusively exchange the communication data along the first core, and the first and second local oscillators exclusively exchange the first local oscillating signal along the second core.

BRIEF DESCRIPTION OF THE DRAWINGS

Fora more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a multi-core optical fiber (MCF) that simultaneously transmits communication data and parameter measurements along different cores. However, the embodiments to be discussed next are not limited to transmitting communication data and parameter measurements, but may be used for the transfer of any data.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a multicore fiber for optical sensing and communication is simultaneously used with communication and measurement devices for simultaneously exchanging communication and measurement data. The communication data is routed along one or more different cores than the measurement data. The MCF is a specialty fiber that contains multiple cores which may be arranged as a ring around the fiber's longitudinal axis or on a two-dimensional grid. In one application, each core in the MCF acts as a separate waveguide, so that light can independently propagate through those cores. In one embodiment, each core in the MCF is used either for sensing or for communication such that their signals are well-separated in space. Under this scenario, the MCF can offer simultaneous multi-channel communication and multi-parameter sensing.

Figure 1:
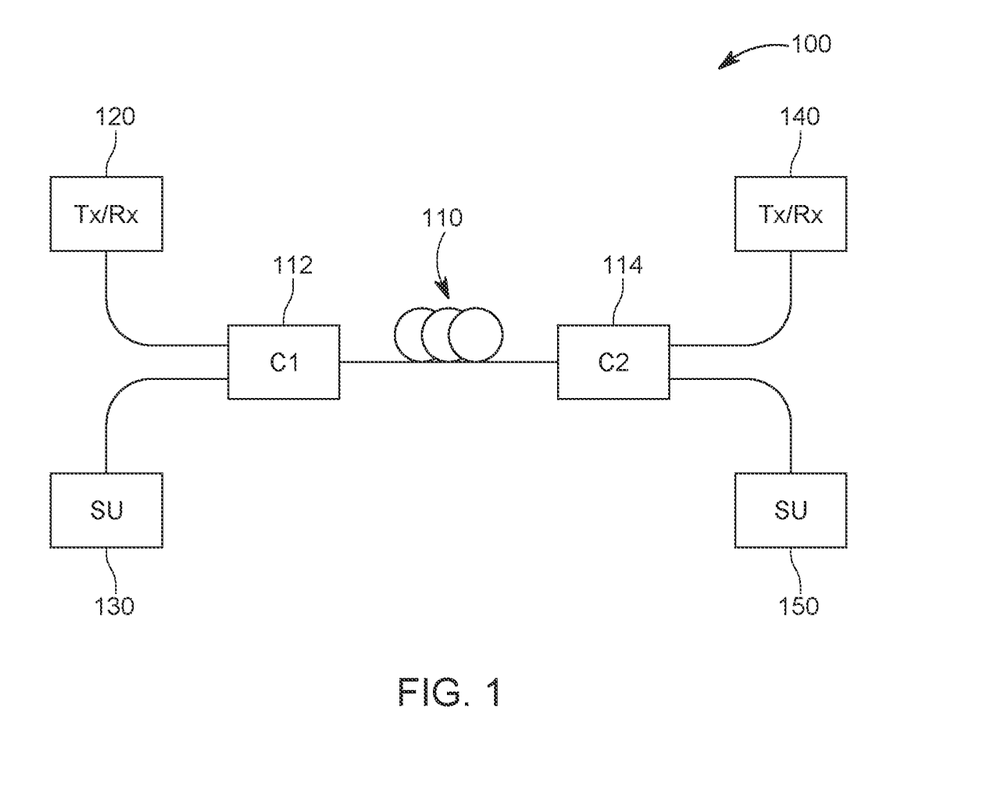
FIG. 1 is a schematic diagram of a hybrid sensing-communication system that uses a multicore fiber.

More specifically, according to an embodiment illustrated in FIG. 1, a hybrid sensing-communication system 100 includes a MCF 110 connected between a first optical coupler C1 112 and a second optical coupler C2 114. The first and second couplers 112 and 114 are configured to separate the plural cores of the MCF 110 and connect each core to a different device. For example, as shown in FIG. 1, the first coupler 112 connects a first core of the MCF 110 to a communication device 120 and a second core of the MCF to a sensing unit SU 130.

The figure further schematically shows that the communication device 120 can include a transmitter Tx and/or a receiver Rx, as normally found in an optical device, e.g., optical router, optical server, optical node, etc. The communication device 120 may be capable of transmitting and/or receiving the communication data using optical signals. The sensing unit 130 may be any device that can (1) receive an optical signal from the MCF 110 and read the measurements stored in the optical signal or (2) generate an optical signal that carriers one or more parameter measurements. In one application, the sensing unit is a light emitting diode or a light detecting diode.

The second coupler 114 is also configured to connect the first core of the MCF 110 to a communication device 140 and the second core of the MCF to a sensing unit SU 150. The figure schematically shows that the communication device 140 can include a transmitter Tx and/or a receiver Rx, as normally found in an optical device, e.g., optical router, optical server, optical node, etc. The communication device 140 may be capable of transmitting and/or receiving the communication data using optical signals. The sensing unit 150 may be any device that can (1) receive an optical signal from the MFC 110 and read the measurements stored in the optical signal or (2) generate an optical signal that carriers one or more parameter measurements.

Figure 2:
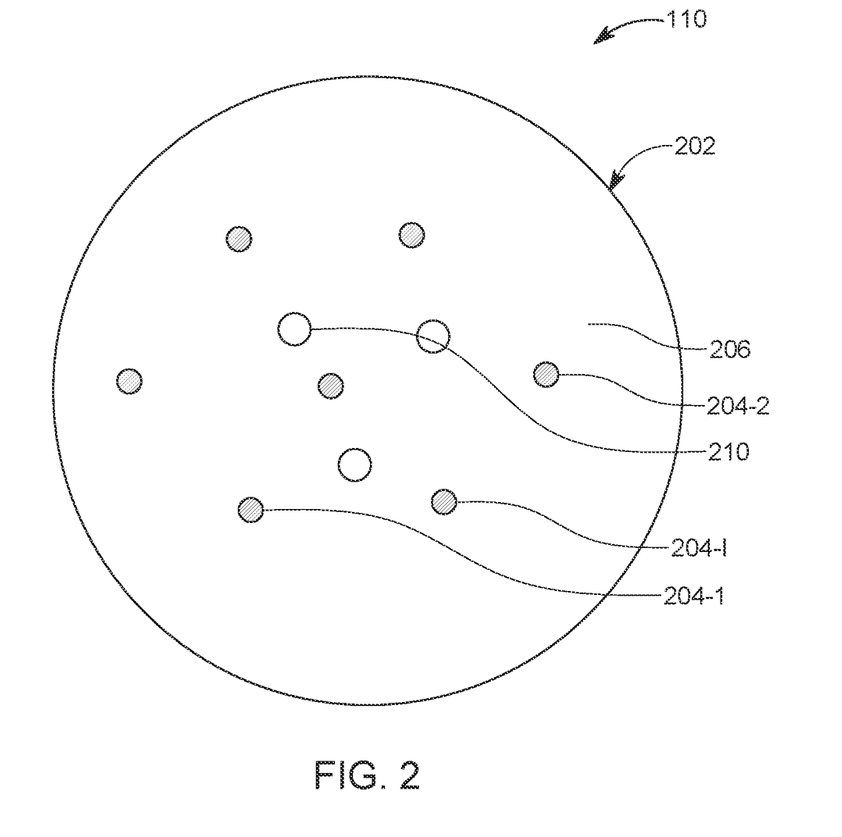
FIG. 2 shows a transversal cross-section through the multicore fiber.

Although FIG. 1 shows the MFC 110 as having only two cores, the MFC may have I different cores, where I is an integer equal to or larger than 2. As a representative example, a seven-core fiber which has six cores on the edges of a hexagon and a central core in the middle is shown in FIG. 2. Note that the MFC 110 shown in FIG. 2 has the plural cores 204-I distributed inside a cladding material 206 and a sheath 202 may protect both the cores and the cladding material. The optical signals travel only through the cores 204-I. One or more tension cables 210 may be provided inside or outside the sheath 202 for offering mechanical strength to the MFC 110. Each core 204-I is used for either sensing or communication, to avoid creating noise in the two subsystems because of the optical signals interference. For example, considering the MCF 110 shown in FIG. 2, three cores can be used as independent communication channels and the other four cores are deployed for multi-parameter sensing applications.

Figure 3:
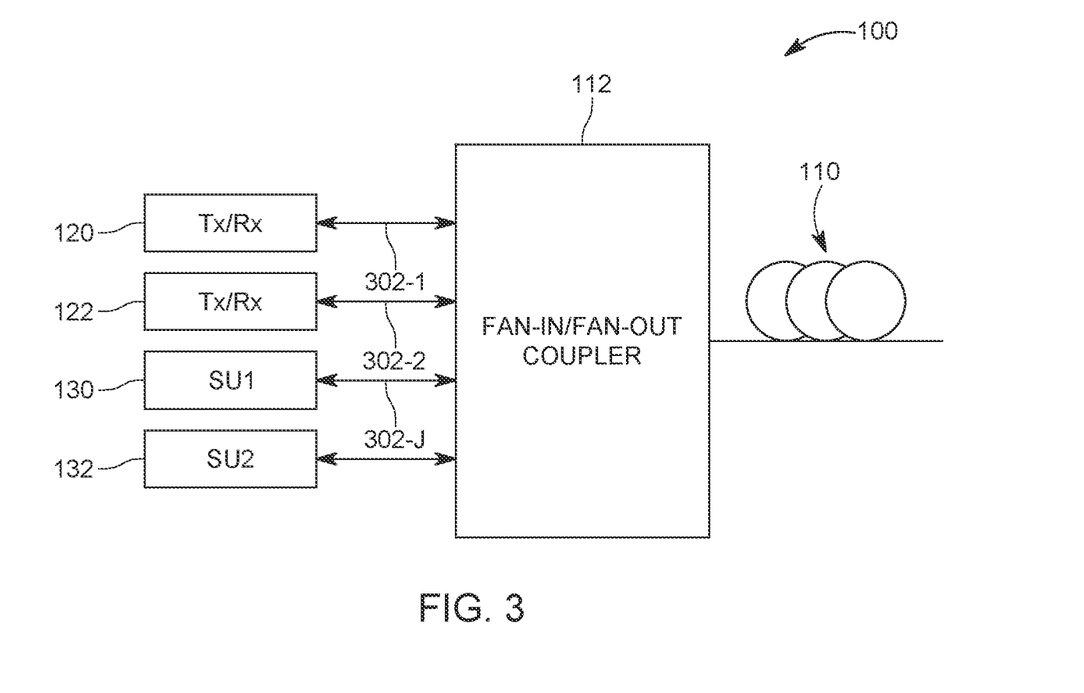
FIG. 3 shows an implementation of the hybrid sensing-communication system that uses the multicore fiber.
Figure 4:
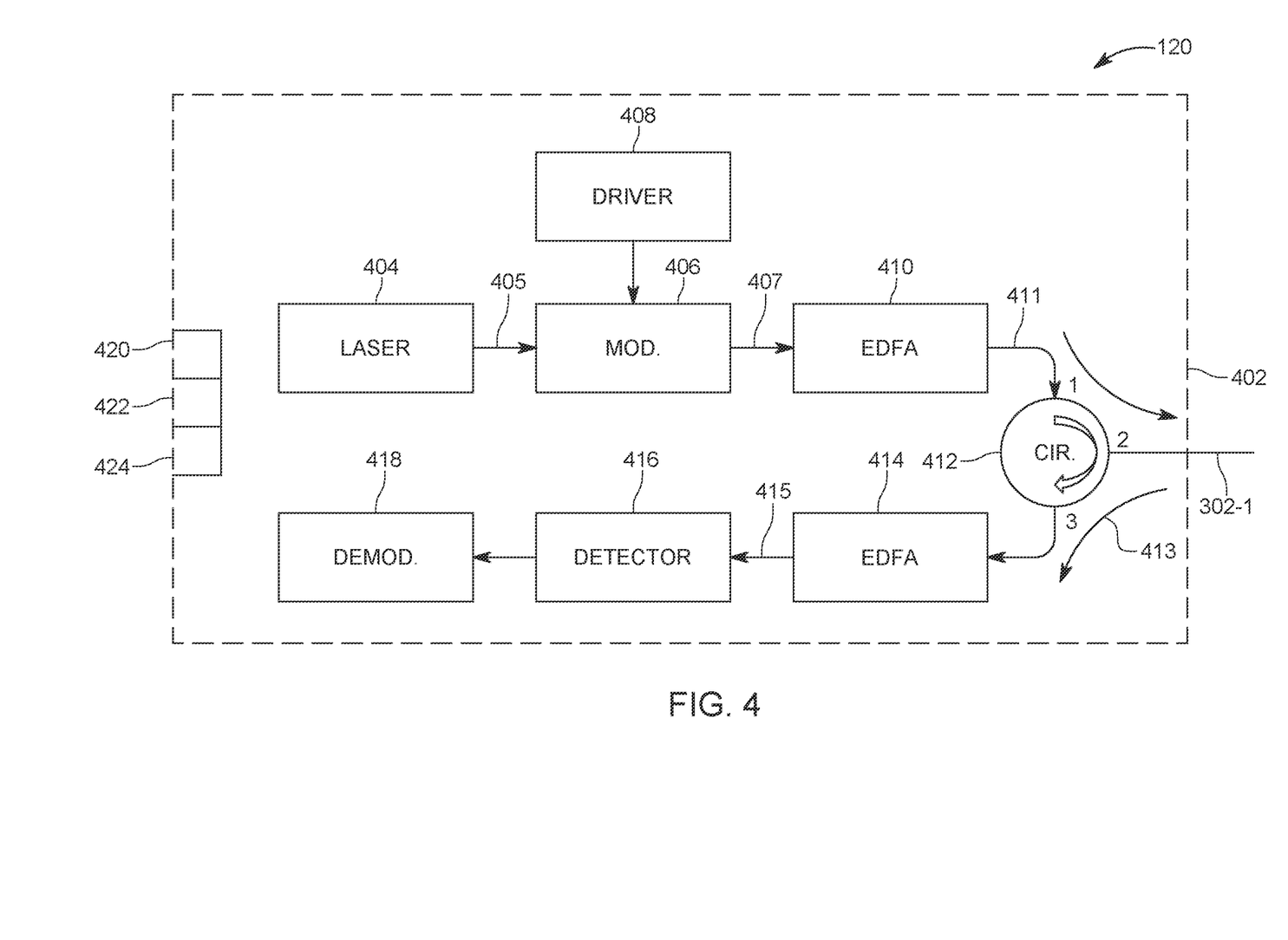
FIG. 4 shows a configuration of a communication device that is part of the hybrid sensing-communication system.
Figure 5:
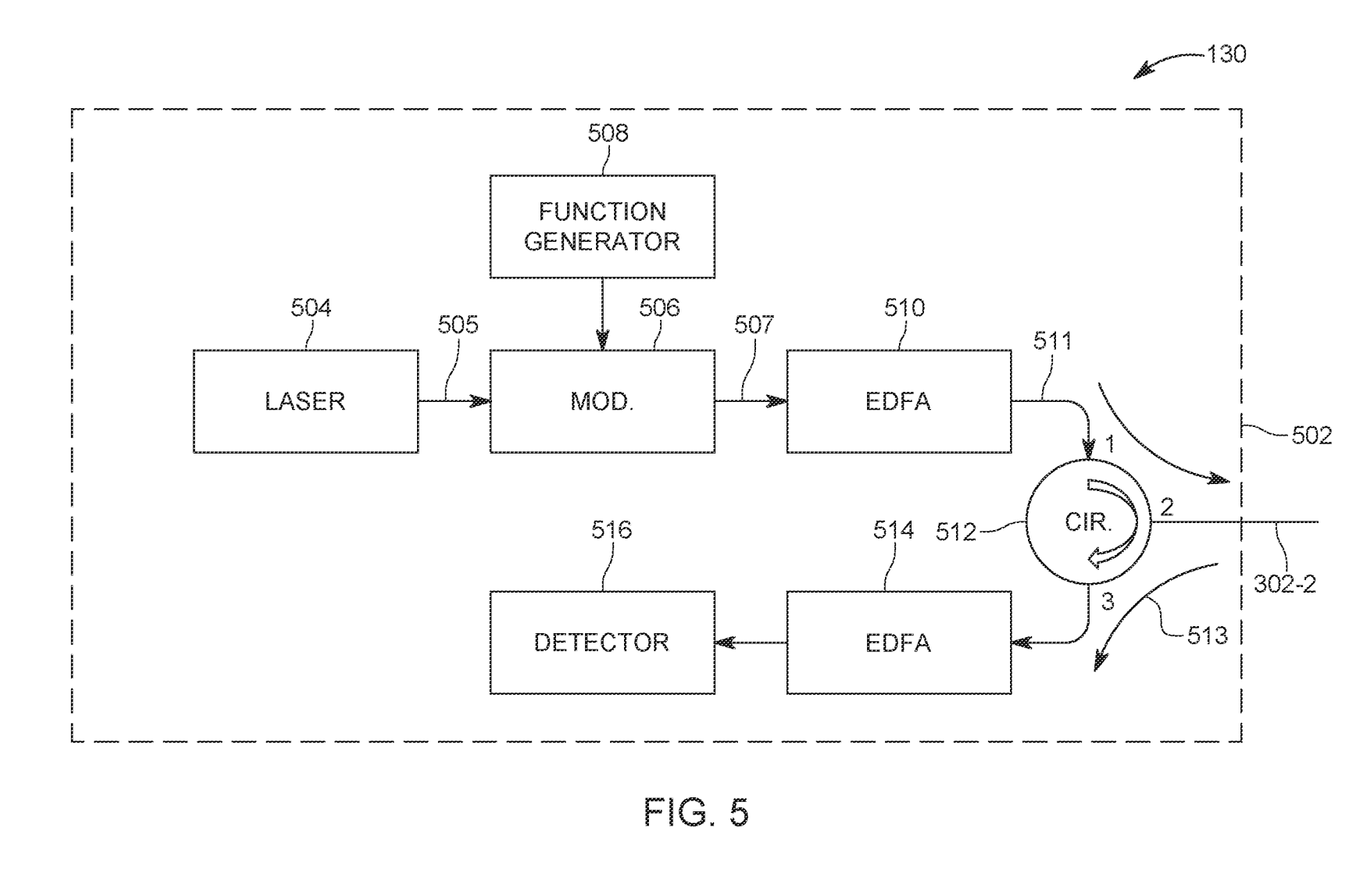
FIG. 5 shows a configuration of a sensing device that is part of the hybrid sensing-communication system.

FIGS. 3 to 5 show a more detailed implementation of the system 100 discussed above. FIG. 3 illustrates that the MFC fiber 110 is connected to a fan-in/fan-out coupler 112 that connects the MFC fiber 110 to individual single optical fibers 302-J, where J is an integer equal to or larger than 2. In one embodiment, the number J of single optical fibers is equal to the number I of cores in the MFC 110. However, in one embodiment J is smaller than I. The example shown in FIG. 3 shows for simplicity only four single optical fibers 302-J. A larger number of single optical fibers may be used. Two of the single optical fibers 302-1 and 302-2 are connected to corresponding communication devices 120 and 122, while the other two single optical fibers are connected to corresponding sensing units 130 and 132. The sensing units and the communication devices' transmitters/receivers (Tx/Rx) inject/receive light into/from the MCF 110. Light injection/reception into/from the individual cores of the MCF is performed via the fan-in/fan-out coupler.

One possible internal configuration of the communication device 120 is shown in FIG. 4. The communication device 120 may have a housing 402 that hosts a light generation device 404, for example, a laser, which generates a continuous wave (CW) light 405. The CW light 405 is modulated via an electro-optic (EO) modulator 406, which is driven by an electronic driver 408, based on an electronic signal, e.g., a radio-frequency (RF) signal/information. The EO modulator 406 can produce any kind of modulation, such as amplitude modulation, phase modulation, frequency modulation, etc. The modulated light 407 might be amplified using an erbium-doped fiber amplifier (EDFA) 410 and the amplified light 411 is directed towards the fan-in/fan-out coupler 112 via a circulator 412. The circulator 412 in the figure has three ports 1-3, one for receiving the amplified light 411, one that is connected to the corresponding single optical fiber 302-1 for sending or receiving an optical signal, and one connected to a demodulation arm of the communication device 120, which is discussed next. Note that an optical circulator is a structure that receives an optical signal at any port and outputs that signal at the next port.

A received optical signal 413 at port 2, from the fan-in/fan-out coupler 112, is directed, via the circulator 412's port 3, towards another EDFA 414 for possible amplification. The amplified received signal 415 is then detected by a detector 416, and demodulated at a demodulator 418 to extract the information carried by the optical signal 413. This configuration of the communication device can be placed at only one end of the MCF or at its both ends for bidirectional communication. The structure of the communication device 120 can be modified to add more electronics for stabilizing the signals and further improving their accuracy. In one application, the communication device may also include a power source 420 for supplying electrical energy to the elements hosted by the housing 120. The power source 420 may be an autonomous source, e.g., a battery, or connected to an external energy supply source. Further, the communication device may include a processor 422 for coordinating the activities of the elements discussed above, and an RF communication module 424 that is configured to control the driver 408. The RF communication module may communicate in a wired or wireless manner with a source of the RF signal that is used for modulating the CW light 405. As previously noted, the communication device 120 may be a router, server, network component, cell tower, or similar device that uses an optical signal to encode and/or decode data.

In one embodiment, what distinguishes the communication device 120 from the sensing unit 130, is that the communication device is capable of modulating the optical signal with the driver 408, to encode commands or communication data, and also is capable of demodulating the received optical signal with the demodulator 418 for extracting the commands or communication data received from another communication device. The communication data is defined in this application as being data that is associated with a voice, an imagine, a video, a written text, or any other data that is not simply a measurement of a parameter of an object or a human or animal or plant (i.e., a living organism). In other words, the communication data is related to a logical process executed by a human being. The sensing data, which is received or sent by the sensing unit 130 is associated with the measurement of a parameter associated with an object or a living organism, but this parameter is not associated with a logical process. For example, a sensing unit can measure a light intensity of a cell, where the light intensity is the parameter, and is a natural phenomenon. However, taking the picture of the same cell, which is still related to the light intensity of the cell, constitutes communication data, as the picture of the cell involves a logical process of putting together the various parts of the cell and their light intensities to construct the final image of the cell. In one example, the sensing data is defined to be related to one or more measured parameters of the ambient while the communication data is related to non-measured data. While these examples are intended to provide an understanding of the differences between the communication data and parameter data, those skilled in the art would understand from this discussion that other differences between these two types of data may exist and the communication data involves more than simply measuring a parameter and transmitting it over the MCF 110.

One possible structure of the sensing unit 130 is shown in FIG. 5 and it includes a housing 502 that hosts a light source 504, for example, a laser source, which is configured to generate a CW light 505. The light 505 can be optionally modulated with an EO modulator 506, which is driven by a function generator 508. Note that the function generator 508 is different from the driver 408 of the communication device 120 as the function generator 508 can use one or more predefined functions for modulating the light 505 while the driver 408 uses a signal that stores information for modulating the light 405. In other words, the function generator 508 is limited to generating only functions, while the driver 408 is not. If needed, the modulated light 507 is amplified with an EDFA 510 and then the amplified light 511 is delivered through a circulator 512 to the fan-in/fan-out coupler 112, via another single optical fiber 302-J. The received light 513 from the fan-in/fan-out coupler 112 is directed via the circulator 512 to an EDFA 514, for possible amplification, followed by detection at a detector 516. The circulator 512 may have the above discussed configuration of the circulator 412. The sensing unit 130 can be located at one end of the MCF or at its both ends for bidirectional sensing. Each sensing unit can detect/measure/monitor one or more parameters and materials including, but not limited to, temperature, pressure, strain, vibration, gas, oil, pollution, etc. As discussed above, the parameters monitored with the sensing unit and the data generated by these parameters is different from the communication data in at least the sense that the parameter related data does not describe a logical process, while the communication data involves describing a logical process, for example, taking a video, writing a text, speaking, or putting together measured parameters to generate an image.

Figure 6:
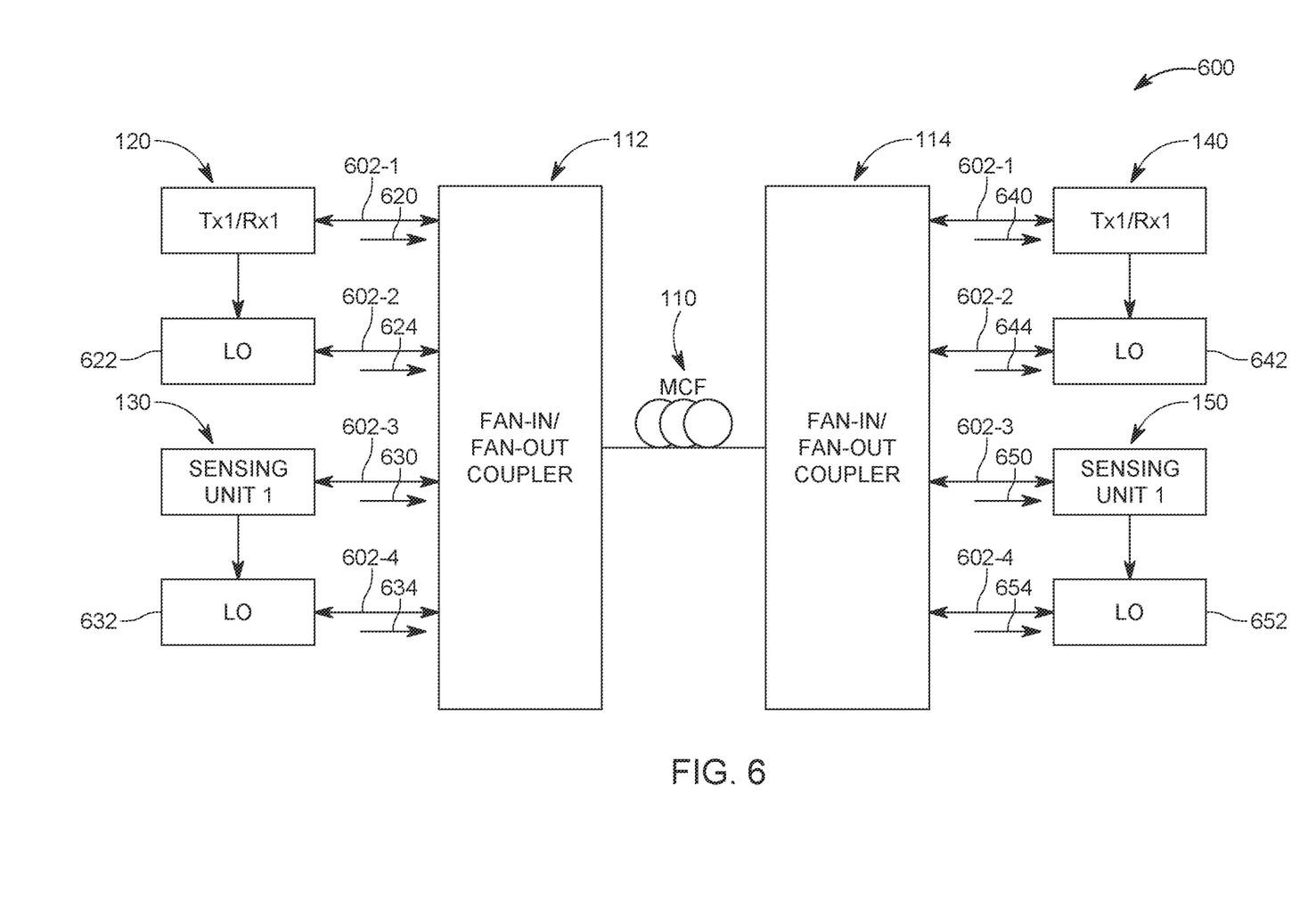
FIG. 6 shows another implementation of the hybrid sensing-communication system that uses the multicore fiber.

One possible application of the system 100 is now discussed with regard to FIG. 6 and is related to a coherent optical sensing and communication system 600. In a traditional coherent optical sensing and communication system, a local oscillator (LO) signal is mixed with the received light to improve the signal-to-noise ratio (SNR) of the system. However, such coherent system suffers from the temporal instability in the frequency and the phase difference between the received signal and the LO signal. This happens because the transmitter and the LO source can never be exactly identical. Note that a local oscillator is an electronic circuit that produces a periodic, oscillating electronic signal. Many complicated digital signal processing (DSP) techniques are needed to synchronize the transmitter and LO, to compensate for the frequency and phase noise.

However, by using the configuration shown in FIG. 6, a communication signal 620 can be transmitted through one core 602-1 of the MCF 110, and its corresponding LO signal 624, which is generated by a LO 622 located next to or being part of the communication device 120, is transmitted through another core 602-2, such that both a received signal 640 (which can be transmitted signal 620) at the receiving communication device 140 and the received LO signal 644 (which is LO signal 624) at the receiving LO 642 are originated from the same source, but are transmitted on different cores of the MCF 110. FIG. 6 shows the communication devices 120 and 140 at the ends of the MCF 110 utilizing the first fiber or core 602-1 and the LO devices 622 and 642 communicating through the second fiber or core 602-2. This approach guarantees that the receiving communication device 140 always receives the original transmitted signal and its LO from the same source, without any phase and/or frequency noise. Similarly, the sending sensing unit 130 can transmit the light signal 630 and the LO signal 634, from the same source (the source includes the sensing unit 130 and the LO 632) using different cores 602-3 and 602-4, and the receiving sensing unit 150 and the corresponding LO 652 receive the light signal 650 (which corresponds to optical signal 630) and the LO signal 654 (which corresponds to optical signal 634), along the separate cores, without any phase and/or frequency noise. Note that the LO units may be part of the communication devices and/or the sensing units.

FIG. 6 shows that for two communication devices 120 and 140, two different cores of the MFC 110 are used so that the LO signal has its own core. The figure also shows that for two sensing units 130 and 150, two additional cores of the MFC 110 are used so that the LO signal has its own core. This means that the addition of any pair of communication devices or sensing units require two more cores, one for communication/sensing data transmission and another one for the LO signal, so that the system is coherent without any phase and/or frequency noise. Note that at a minimum, the system shown in FIG. 6 needs to have a dedicated core for the LO signal either for the communication devices 120 and 140, or for the sensing units 130 and 150, but not for both. If an enhanced coherency of the system is desired, then each pair of communication devices and/or sensing units may have their dedicated LO signal core. While FIG. 6 shows a pair of communication devices and a pair of sensing units, one skilled in the art should understand that any number N of pairs of communication devices and any number M of pairs of sensing units may be connected to a given MFC, the only limitation being the number of cores available in the MFC, i.e., N+M=number of cores in the MFC, with N and M being integers equal to or larger than one.

The embodiments discussed above show for simplicity that each pair of devices connected to the same core of the MCF are identical or similar. However, it is also possible that two different devices are connected to the two ends of the same core of the MCF, for example, a sensing unit and a processing device, where the sensing unit measures a parameter, sends the parameter to the processing device, and the processing device process the received data and provides a user with a value of the parameter. Other device combinations are possible for a given core of the MCF, for example, one communication device is generating context and the other communication device is consuming the content. In other words, the two devices that are connected to the same core of the MCF do not have to be identical.

Figure 7:
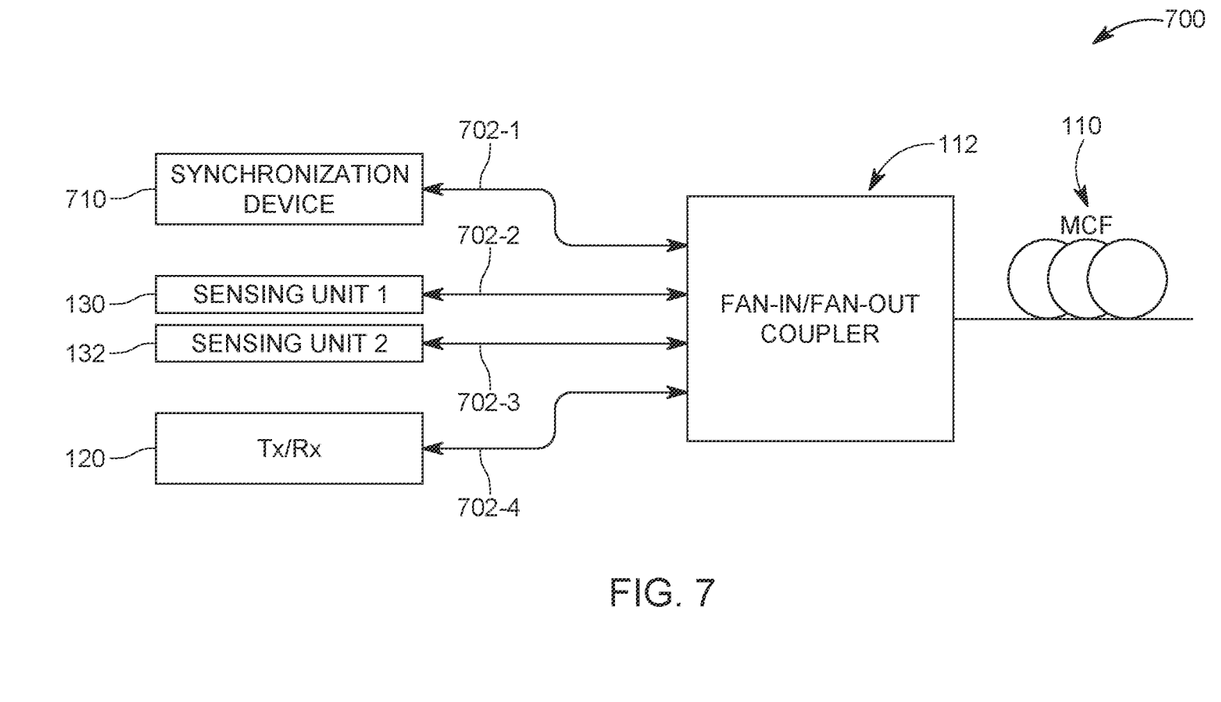
FIG. 7 shows still another implementation of the hybrid sensing-communication system that uses the multicore fiber.

Another application of the system 100 is in the field of managing complex optical sensing networks. For an optical sensing network that includes thousands of sensors, the synchronization between the sensors is necessary. Additionally, the large amount of data produced by these sensors should be transmitted to either end of the network. If the system 100 is implemented with the configuration shown in FIG. 7, such a system 700 would have a synchronization device 710, e.g., a processor, that is configured to synchronize the sensing units. Under this scenario, some of the MCF 110's cores 702-2 and 702-3 are used for sensing applications, together with the sensing units 130 and 132, while one or more other cores 702-1 convey the synchronization signals. In addition, one or more other cores 702-4 may be used to connect the communication device 120 so that communication data may also be exchanged through the MCF 110. Any number of cores may be used for the synchronization, or the sensing or the communication data, as long as at least one core is dedicated to the synchronization function.

Figure 8:
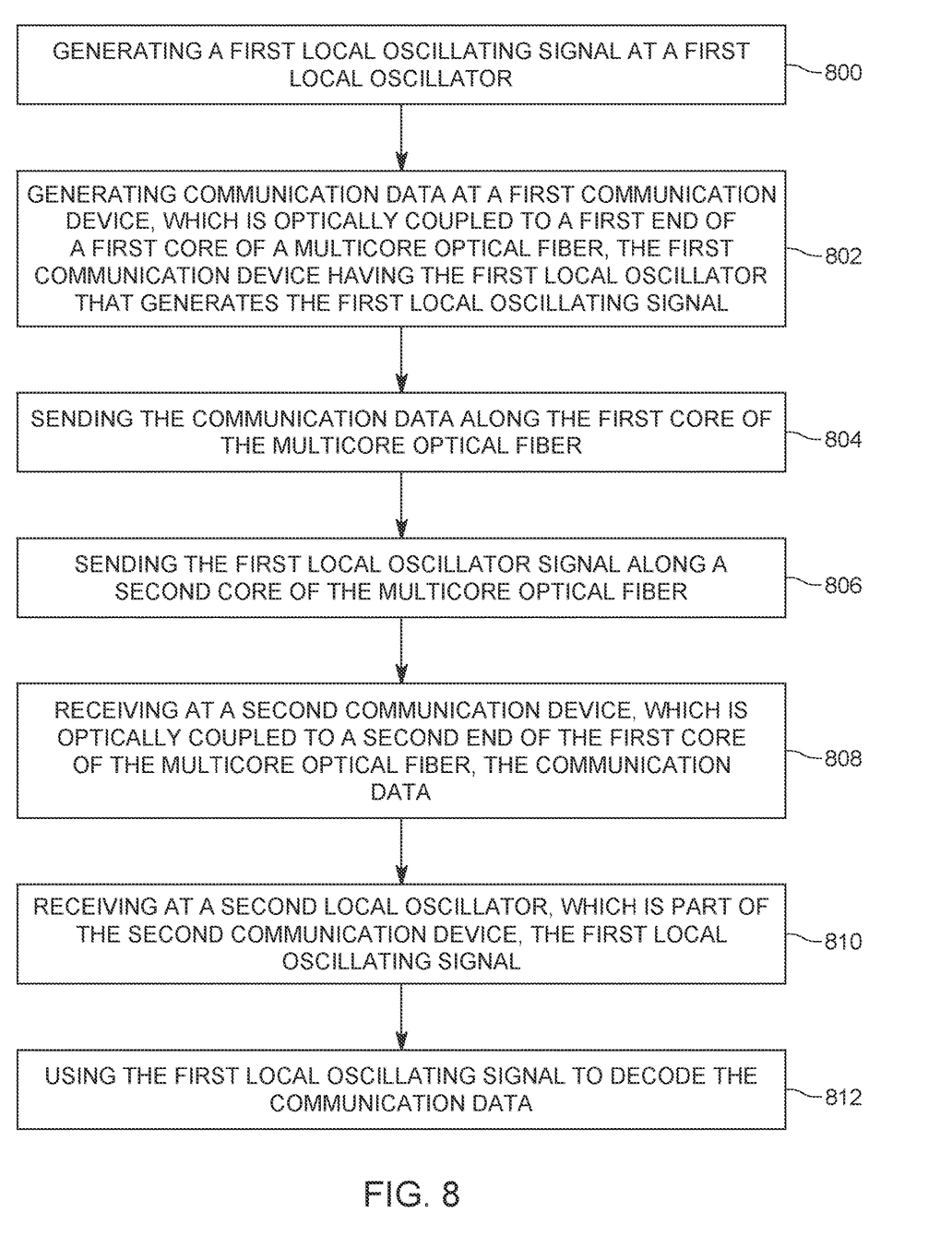
FIG. 8 is a flow chart of a method for synchronizing a hybrid sensing-communication system that uses the multi-core fiber.

A method for synchronizing devices in a network is discussed with regard to FIG. 8. The method includes a step 800 of generating the first local oscillating signal 624 at the first local oscillator 622, a step 802 of generating the communication data 620 at the first communication device 120, which is optically coupled to the first end of the first core 302-1 of the multicore optical fiber 110, the first communication device 120 including the first local oscillator 622 that generates the first local oscillating signal 624, a step 804 of sending the communication data along the first core 302-1 of the multicore optical fiber 110, a step 806 of sending the first local oscillator signal 624 along the second core 302-2 of the multicore optical fiber 110, a step 808 of receiving at the second communication device 140, which is optically coupled to the second end of the first core 302-1 of the multicore optical fiber 110, the communication data 620, a step 810 of receiving at the second local oscillator 642, which is part of the second communication device 140, the first local oscillating signal 624, and a step 812 of using the first local oscillating signal 624 to decode the communication data 620. In this last step, the second local oscillator 642 may use the first local oscillating signal 624 to correct/adjust its local oscillating time, so that the first and second local oscillators 622 and 642 are in sync. The first and second communication devices exclusively exchange the communication data along the first core, and the first and second local oscillators exclusively exchange the first local oscillating signal along the second core.

The disclosed embodiments provide a hybrid sensing-communication system that uses a multicore optical fiber for simultaneously sending communication data and sensing data across different cores of the fiber. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A hybrid sensing-communication system comprising:
a multicore optical fiber that includes first and second cores;
a first communication device optically coupled to a first end of the first core of the multicore optical fiber;
a second communication device optically coupled to a second end of the first core of the multicore optical fiber;
a first sensing device optically coupled to a first end of the second core of the multicore optical fiber; and a second sensing device optically coupled to a second end of the second core of the multicore optical fiber,
wherein the first and second communication devices exclusively exchange communication data along the first core, the first and second sensing devices exclusively exchange sensing data along the second core, and the communication data is different from the sensing data.

2. The system of claim 1, wherein the first and second sensing devices are configured to measure a parameter of an ambient.

3. The system of claim 2, wherein the parameter is at least one of a temperature, pressure, light intensity, strain, vibration, gas, and oil.

4. The system of claim 1, wherein the first and second communication devices are configured to exchange non-measured data.

5. The system of claim 1, wherein the first communication device is a router and the first sensing device is a light detecting diode.

6. The system of claim 1, further comprising:
a first optical coupler optically connecting (1) a first end of the multicore optical fiber to (2) the first communication device and the first sensing device; and
a second optical coupler optically connecting (1) a second end of the multicore optical fiber to (2) the second communication device and the second sensing device.

7. The system of claim 6, wherein the first communication device comprises:
a light source;
a light modulator optically connected to the light source and configured to modulate light from the light source to encode the communication data;
a light amplifier optically connected to the light modulator;
a circulator configured to receive amplified light from the light amplifier and to pass the amplified light to the first coupler;
a light detector configured to receive light from the circulator; and
a demodulator configured to demodulate the received light from the light detector and to extract the communication data.

8. The system of claim 7, wherein the first communication device further comprises:
an electronic driver that encodes the communication data into the light by controlling the modulator.

9. The system of claim 8, wherein the first sensing device is identical to the first communication device except that the electronic device is replaced with a function generation device and the first sensing device does not have a demodulator.

10. A coherent optical sensing and communication system comprising:
a multicore optical fiber that includes first and second cores;
a first communication device optically coupled to a first end of the first core of the multicore optical fiber, the first communication device having a first local oscillator that generates a first local oscillating signal;
a second communication device optically coupled to a second end of the first core of the multicore optical fiber, the second communication device having a second local oscillator that receives the first local oscillating signal;
a first sensing device optically coupled to a first end of a third core of the multicore optical fiber, the first sensing device having a third local oscillator that generates a second local oscillating signal; and
a second sensing device optically coupled to a second end of the third core of the multicore optical fiber, the second sensing device having a fourth local oscillator that receives the second local oscillating signal,
wherein the first and second communication devices exclusively exchange communication data along the first core,
wherein the first and second local oscillators exclusively exchange the first local oscillating signal along the second core,
wherein the first and second sensing devices exclusively exchange sensing data along the third core, and
wherein the third and fourth local oscillators exclusively exchange the second local oscillator signal along a fourth core of the multicore optical fiber.

11. The system of claim 10, wherein the first and second sensing devices are configured to measure a parameter of an ambient.

12. The system of claim 11, wherein the parameter is at least one of a temperature, pressure, light intensity, strain, vibration, gas, and oil.

13. The system of claim 10, wherein the first and second communication devices are configured to exchange non-measured data.

14. The system of claim 11, wherein the first communication device is a router and the first sensing device is a light detecting diode.

15. The system of claim 11, further comprising:
a first optical coupler optically connecting (1) a first end of the multicore optical fiber to (2) the first communication device, the first local oscillator, the first sensing device, and the third local oscillator; and
a second optical coupler optically connecting (1) a second end of the multicore optical fiber to (2) the second communication device, the second local oscillator, the second sensing device, and the fourth local oscillator.

16. The system of claim 15, wherein the first communication device comprises:
a light source;
a light modulator optically connected to the light source and configured to modulate light from the light source to encode the communication data;
an light amplifier optically connected to the light modulator;
a circulator configured to receive amplified light from the light amplifier and to pass the amplified light to the first coupler;
a light detector configured to receive light from the circulator; and
a demodulator configured to demodulate the received light from the light detector and to extract the communication data.

17. The system of claim 16, wherein the first communication device further comprises:
an electronic driver that encodes the communication data into the light by controlling the modulator.

18. The system of claim 17, wherein the first sensing device is identical to the first communication device except that the electronic device is replaced with a function generation device and the first sensing device does not have a demodulator.

19. A method for synchronizing communication and sensing devices in a network, the method comprising:
generating a first local oscillating signal at a first local oscillator;

generating communication data at a first communication device which is optically coupled to a first end of a first core of a multicore optical fiber, the first communication device having the first local oscillator that generates the first local oscillating signal;

sending the communication data along the first core of the multicore optical fiber;

sending the first local oscillator signal along a second core of the multicore optical fiber;

receiving at a second communication device, which is optically coupled to a second end of the first core of the multicore optical fiber, the communication data;

receiving at a second local oscillator, which is part of the second communication device, the first local oscillating signal;

using the first local oscillating signal to decode the communication data;

sending sensing data with a first sensing device optically coupled to a first end of a third core of the multicore optical fiber, the first sensing device having a third local oscillator that generates a second local oscillating signal;

sending the second local oscillating signal along a fourth core of the multicore optical fiber;

receiving the sensing data at a second sensing device optically coupled to a second end of the third core of the multicore optical fiber, the second sensing device having a fourth local oscillator that receives the second local oscillating signal along the fourth core of the multicore optical fiber, wherein the first and second communication devices exclusively exchange the communication data along the first core, wherein the first and second local oscillators exclusively exchange the first local oscillating signal along the second core, wherein the first and second sensing devices exclusively exchange sensing data along the third core, and wherein the third and fourth local oscillators exclusively exchange the second local oscillator signal along the fourth core.

* * * * *